United States Patent [19]

Greenleaf et al.

[11] Patent Number: 4,463,560
[45] Date of Patent: Aug. 7, 1984

[54] THERMAL ACTUATOR APPARATUS

[75] Inventors: Allen H. Greenleaf, Pownal, Me.; Robert L. Milamed, Swampscott, Mass.

[73] Assignee: Itek Corporation, Lexington, Mass.

[21] Appl. No.: 434,799

[22] Filed: Oct. 18, 1982

[51] Int. Cl.³ .............................................. F03G 7/06
[52] U.S. Cl. ...................................... 60/527; 60/528; 267/174
[58] Field of Search .................. 60/527, 528, 529; 236/101 R, DIG. 17; 267/174

[56] References Cited

U.S. PATENT DOCUMENTS

| | | | |
|---|---|---|---|
| 423,842 | 3/1890 | Wach | 60/529 |
| 2,236,158 | 3/1941 | Rockefeller, Jr. | 267/174 X |
| 2,974,944 | 3/1961 | Terp | 267/174 |

*Primary Examiner*—Stephen F. Husar
*Attorney, Agent, or Firm*—Homer O. Blair; Robert L. Nathans; Gerald H. Glanzman

[57] ABSTRACT

Thermal actuator apparatus for controlling or adjusting the position of a surface or other object as a function of temperature. The principle of operation is the rate of change, as a function of temperature, in the modulus of rigidity or elasticity of counterbalanced springs of differing materials resulting in a change in equilibrium position. An actuating surface is coupled to the spring system, and its movement with temperature change can be used to change or otherwise control the position of an object.

A simple adjustment is also provided to permit varying thermal coefficients of the actuator (magnitude of the response to temperature change).

13 Claims, 5 Drawing Figures

U.S. Patent    Aug. 7, 1984    4,463,560
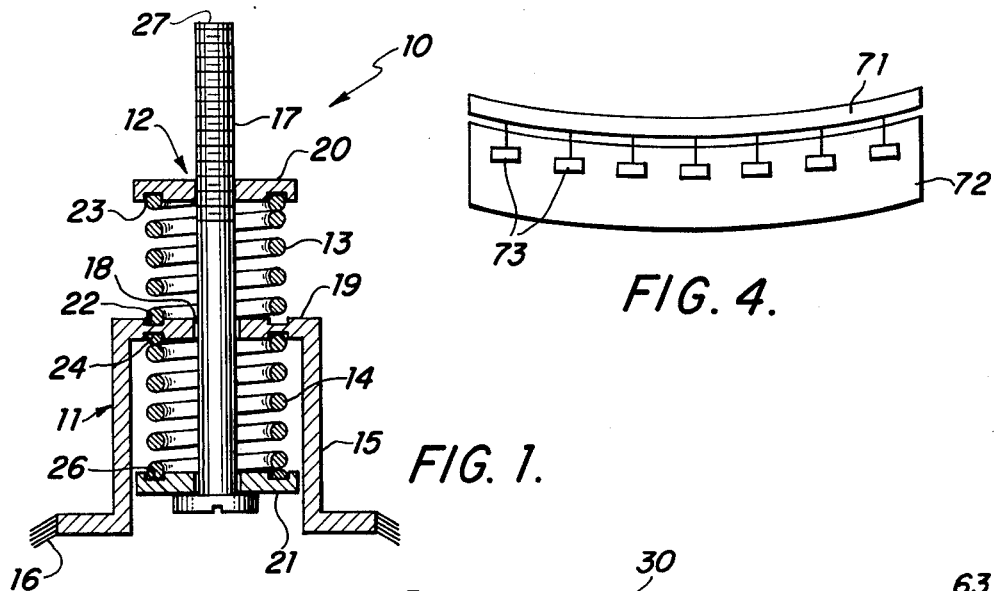
FIG. 1.
FIG. 4.
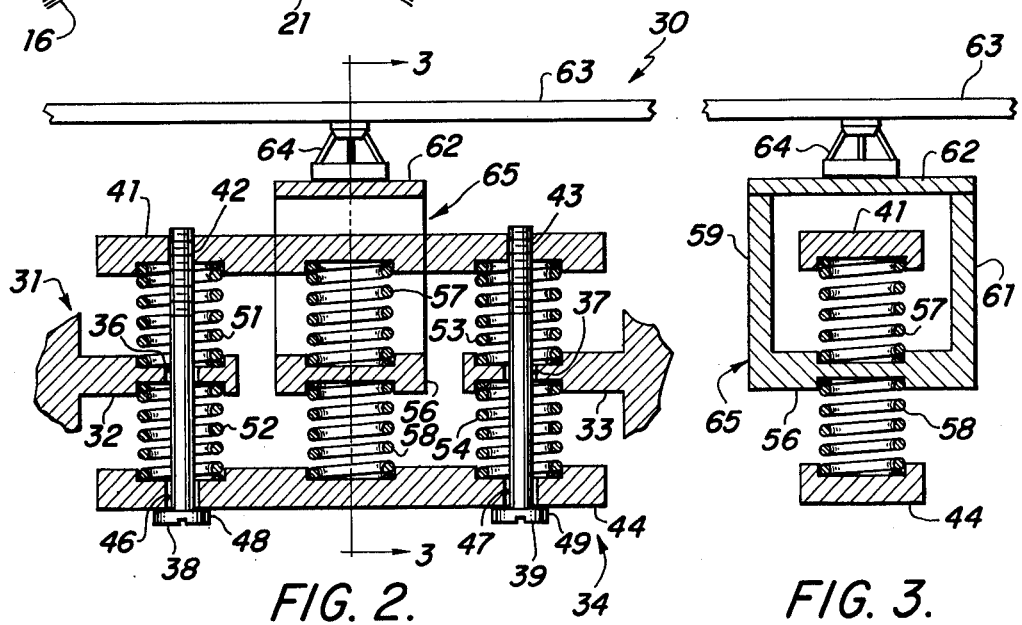
FIG. 2.
FIG. 3.
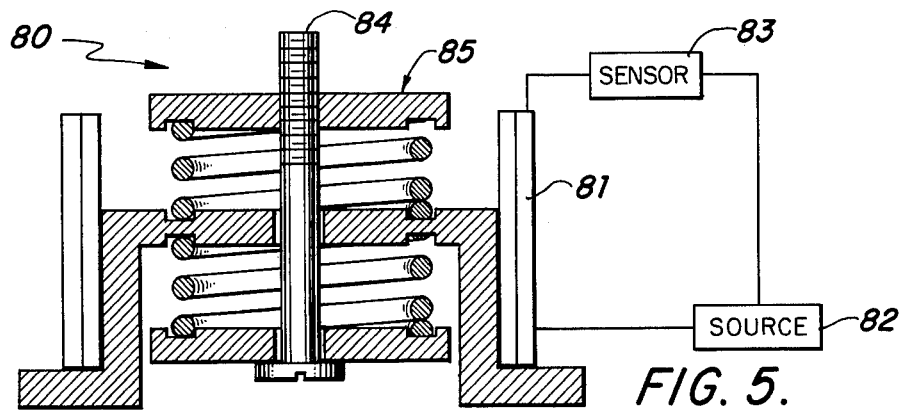
FIG. 5.

THERMAL ACTUATOR APPARATUS

DESCRIPTION

Technical Field

The present invention relates generally to a thermal actuator apparatus. More particularly, the invention relates to a temperature responsive device which can be used to control or adjust the position of a surface or other object as a function of temperature.

Background Art

Essentially, all substances are temperature sensitive to some degree. Most substances, in fact, will expand when their temperature increases and contract when their temperature is reduced.

Some materials, such as Invar, are relatively temperature insensitive and objects made from them will expand or contract very little even with large temperature variations, while other materials, such as aluminum, are quite temperature sensitive and the dimensions of objects made from such materials will change relatively significantly. In addition, as will be amplified hereinafter, a number of objects will expand or contract non-uniformly as temperature changes due to inhomogeneities in the material of which the object is made.

Temperature sensitivity is thus obviously a very important consideration in a great many applications. In outer space, for example, where very large and abrupt temperature changes can be encountered, mirrors (as might be used in a space telescope, for example) which are designed to have very precisely shaped surfaces can distort significantly as the temperature changes and this can severely affect their accuracy.

Both in the laboratory and in industry there are many other areas where extreme accuracy is required, and variations in the shape or position of an object must be adjusted or otherwise controlled to compensate for variations in temperature. A few other examples of where such control might be desirable are as follows:

1. To maintain a Cassegrain primary mirror position constant with respect to a secondary mirror.
2. To maintain the postion of a mirror in an interferometer or in a laser resonator cavity constant.
3. To compensate for changes in the index of refraction of glass due to temperature changes, in various devices.
4. To position and align mirrors, lenses or other surfaces to compensate for small motions or long term drifts due to temperature changes.

Other examples will become readily apparent to those skilled in the art, and some will be discussed hereinafter.

In the prior art, the problem of temperature sensitivity is often attacked by utilizing materials, such as Invar, which are relatively insensitive to temperature changes. There are many applications, however, where Invar and similar materials cannot effectively be used.

In other applications, bi-metallic springs having components of differing thermal expansion have been empolyed. Such devices, however, have the disadvantage that once they are set, they can no longer be adjusted and this makes them inappropriate for applications wherein final adjustments cannot effectively be made until the object to be controlled is placed in its actual or simulated operative environment (for example, in simulated outer space).

Thus, there is a real need for a device that can very accurately respond to changes in temperature to control the position of a surface or other object and which further can easily be adjusted or re-adjusted whenever necessary.

Disclosure of Invention

In accordance with the present invention, an apparatus is provided which can accurately respond to variations in temperature so as to permit precise control over the shape or position of an element.

The invention in probably its simplest form comprises a device employing two spring means having different thermo-elastic coefficients together with means for adjusting the initial force or the "preload" on the springs to control the responsiveness of the device. Thermo-elastic coefficient is the rate of change of modulus of elasticity or modulus of rigidity with change in temperature. A spring made of a material having a very low thermo-elastic coefficient would have a nearly constant spring rate over a large temperature range, while a spring made of a more conventional material would exhibit a significant change in spring rate over a large temperature range.

In a first embodiment, the device consists of a first spring means, which is relatively insensitive to temperature changes, and a second spring means which is substantially responsive to temperature variations, mounted together to define a balanced spring system. The spring system is positioned between a stationary base or housing portion (sometimes referred to simply as a support portion) and a relatively moveable actuating portion. The actuating portion is in contact with or otherwise coupled to the object to be controlled, and, as temperature changes, the relative difference in the thermo-elastic coefficients of the two spring means will cause the relative lengths of the springs to change to maintain the system in equilibrium and this will cause the moveable actuating member to move relative to the stationary base member thus changing the position of the object.

It should be emphasized here that the present invention operates by employing materials differing in their thermo-elastic coefficients, while prior art bimetallic spring systems operate due to a difference in thermal expansion.

By adjusting the preload on the spring means, the responsiveness of the system to temperature change can be controlled, i.e., the thermal-coefficient (in units of change in actuating surface positions per degree) of the actuator is changed.

In one embodiment of the system, the device is designed such that the actuating member will stay stationary as the preload is adjusted. This is an important property in many applications as will be amplified on hereinafter.

In a further embodiment, a heating element can be added to the device, and, in this way, positive control can be maintained over the position of an object by controlling the temperature of the actuator.

Further details and specific features of the invention will be set out hereinafter in conjunction with the description of the best mode for carrying out the invention.

BRIEF DESCRIPTION OF THE DRAWINGS

FIG. 1 schematically illustrates, in partial cross-section, a thermal actuator according to one embodiment of the invention.

FIG. 2 illustrates, in partial cross-section, a thermal actuator according to a presently preferred embodiment of the invention.

FIG. 3 illustrates a cross-sectional view of the actuator of FIG. 2 looking in the direction of arrows 3—3 in FIG. 2.

FIG. 4 schematically illustrates an application of the thermal actuator of the present invention.

FIG. 5 schematically illustrates, in partial cross-section, a third embodiment of the present invention.

BEST MODE FOR CARRYING OUT THE INVENTION

FIG. 1 illustrates, in somewhat schematic cross-sectional form, one embodiment of the present invention. Specifically, FIG. 1 illustrates a thermal actuator apparatus, generally designed by reference numeral 10, which comprises a housing portion 11, an actuating portion 12, and a pair of spring means 13 and 14 coupling the two portions together for relative movement.

Housing portion 11 basically comprises a generally cylindrically shaped housing 15 which is open at one end and rigidly mounted to some appropriate support structure schematically shown at 16. Actuating portion 12 comprises a screw or bolt 17 slidably extending through a hole 18 in the base 19 of housing portion 11 and having a first disc shaped plate 20 rigidly mounted on its outer end (as by being screwed onto the bolt) and a second disc shaped plate 21 slidably supported on its inner end.

Actuating portion 12 is supported relative to housing portion 11 by means of springs 13 and 14. Spring 13 is a coil spring mounted between the first disc shaped plate 20 and the outer surface of base 19 of housing portion 11 and is supported in position by being mounted within circular grooves 22 and 23 of the base 19 and first plate 20, respectively, as shown. Spring 14 is also a coil spring and is mounted within the housing 11 between the inner surface of base 19 and the second plate 21. It is supported in position by being mounted in circular grooves 24 and 26 in the base 19 and second plate 21, respectively.

Although the two springs 13 and 14 are similar in size and shape, they are constructed of different materials having different thermo-elastic coefficients (thermo-elastic coefficient being defined, as indicated above, as the rate of change of modulus of rigidity or modulus of elasticity with change in temperature). Specifically, one spring, i.e., spring 14, is preferably made of a material such as an iron-nickel-chromium-titanium alloy known as "Ni-Span-C" (a registered trademark of Huntington Alloys, Inc. of Huntington, West Virginia 25720) which is a material having a controllable, very low thermo-elastic coefficient, while the other spring, i.e. spring 13, is preferably made of a more conventional material such as #302 stainless steel which has a much higher thermo-elastic coefficient. A spring made of a material having a very low thermo-elastic coefficient will have a nearly constant spring rate (i.e., constant modulus of rigidity) over a large temperature range while for more conventional spring alloys, the modulus of rigidity will change significantly as temperature changes. Specifically, for stainless steel, as the temperature goes down, the modulus of rigidity will go up and the spring will become stiffer, while for Ni-Span-C, as temperature decreases, the modulus of rigidity actually goes down slightly.

Thus, in the system of FIG. 1, as temperature goes down, the modulus of rigidity of the lower Ni-Span-C spring 14 will stay about the same while the modulus of rigidity of the upper stainless steel spring 13 will increase and that spring will become stiffer. For the same amount of deflection of this spring, therefore, the outward force applied by spring 13 against the lower surface of plate 20 and the upper surface of base 19 will increase according to the equation (for a helical spring):

$$P = (\delta G d^4)/(8 D^3 N)$$

Where:
P = force output in lbs.
G = torsional modulus (modulus of rigidity) lbs./in$^2$
d = wire diameter (inches)
D = mean coil diameter (inches)
N = no. of turns
$\delta$ = deflection (inches)

Because the outward force applied by the upper spring 13 increases, and that applied by lower spring 14 stays about the same, the equilibrium between the two springs is upset and in order to return to equilibrium, the upper spring will expand and the lower spring will compress with the net effect being that actuating member 12 will move upwardly carrying any object coupled to surface 27 or plate 20 either of which we can designate as an actuating surface since they move together) upwardly with it until the springs again reach a balanced equilibrium condition.

The thermal coefficient of the actuator apparatus itself, that is, the change in actuating surface position per degree of temperature change, can easily be varied by varying the initial spring deflection of the system (the spring preload) by rotating the screw 17 one way or the other. This can be done manually or by remote control as is known in the art and this capability provides the system with great flexibility as will be amplified hereinafter.

In FIG. 1, if the lower spring 14 is Ni-Span-C and the upper spring 13 if #302 stainless steel, the ratio of the deflection of the Ni-Span-C spring to the deflection of the stainless steel spring at 100° K. (−279° F.) for springs of the same dimensions increases 8% over the ratio at room temperature. By comparison, the length change of a rod of #302 stainless steel over this temperature range would be only about 0.5%.

As a further example of magnitude of this effect, if two springs having mean diameter = 1.000", wire diameter = 0.090", 10 turns, were used, with a compression of 5 lbs., the lower spring being Ni-Span-C and the upper spring being #302 stainless steel, as temperature decreases from 70° F. to −279° F. (100° K.) the position of the actuating surfaces 27 or 20 would rise 0.36" with respect to the top of the stationary structure. If the initial compression were 2.5 lb. the position of the actuating surface would rise 0.018" with respect to the top of the stationary structure. The thermal coefficient of the same actuator would thus be varied from 103 micro-inches per °F. to 51.5 micro-inches per °F.

In order to test the invention, a model, similar to the embodiment of FIG. 1 was built and tested. The lower spring in the model was Ni-Span-C, and the upper #302 stainless steel. All other components of the actuator were of Invar.

The actuator model was tested to show the variation of deflection with temperature, and to verify that its thermal coefficient could be varied by simply changing the initial spring deflection, using the screw adjustment.

In the test, the actuator model was immersed in a beaker of water. An electric heater was wrapped around the beaker, and the beaker rested on a precision fused silica plate which in turn was on a granite inspection block. For stability, the actuator sat in the beaker on three sapphire balls held in position by a plastic form retainer. A fused silica precision beam was supported on the actuator at one end, and on a 0.06" diameter gage pin used as a pivot, puttied in place on a gage block stack. The optical axis of an auto-collimator looked down on the precision beam. Actuator deflection was measured by the change in angle of the precision beam.

Actuator deflection vs. temperature was plotted at two spring deflections, 0.120" and 190". From the slopes of the best straight lines through this data, the average thermal coefficients from 20° C. to 100° C. were:

Deflection=0.120":
  Thermal coefficient, heating=13.2 $(10^{-6})$in./°C.
  Thermal coefficient, cooling=11.7 $(10^{-6})$in./°C.
Deflection=0.190":
  Thermal coefficient, heating=29.9 $(10^{-6})$in./°C.
  Thermal coefficient, cooling=27.6 $(10^{-6})$in./°C.

This data shows in principle that thermal coefficent can be varied by changing initial spring deflection of the actuator with a simple adjustment. It is thus clear that a thermal actuator as described above can effectively be used to compensate for temperature effects in positioning.

302 stainless steel is preferred for use for spring 13 because of its relatively wide deviation from the modulus of Ni-Span-C as temperature changes. Materials of lesser spread in moduli of elasticity and rigidity can also be chosen, including two different conventional materials, or two Ni-Span-C springs controlled for different thermo-elastic coefficients, and the invention is intended to cover all these possible variations.

The housing 11 and other non-spring portions of the system are preferably made of Invar to minimize their own thermal changes as a function of temperature.

FIGS. 2 and 3 illustrate a second embodiment of the present invention, with FIG. 2 illustrating a generally schematic view of the embodiment while FIG. 3 illustrates a cross-sectional side view thereof looking in the direction of arrows 3—3 in FIG. 2. As will be explained, a key feature of this embodiment, is that the actuating surface remains in the same position as the initial force or spring preload is changed to vary the thermal-coefficient of the actuator.

With reference to FIGS. 2 and 3, the actuator, generally designated by reference number 30 includes a base portion 31 comprising plates 32 and 33 rigidly anchored in position as shown, and a relatively moveable actuator portion 34 supported on base portion 31 via a number of springs. Specifically, base plates 32 and 33 are provided with apertures 36 and 37, respectively, through which a pair of bolts 38 and 39 slidably extend. A first generally rectangular upper plate 41 is rigidly secured to the bolts 38 and 39, as, for example, by screwing the bolts into apertures 42 and 43 in the plate as shown, while a second rectangular lower plate 44 is slidably supported on the bolts 38 and 39 by having the bolts extend through apertures 46 and 47 in the lower plate such that the plate will rest against the bolt heads 48 and 49 as shown in FIG. 2.

A first pair of coil springs 51 and 52 is positioned around the first bolt 38 with the first spring 51 being supported between upper plate 41 and the base member 32 and the second spring 52 being supported between lower plate 44 and the base member 32. A second pair of coil springs 53 and 54 is similarly supported around the second bolt 39 and are supported between base plate 33 and the upper and lower plates 41 and 44, respectively. These springs, as well as other springs in the device, are all held in position against the various plate surfaces by being held within circular shaped recesses formed within the various plate surfaces, as is shown in FIGS. 2 and 3. These recesses have not been numbered in the FIGS., however, for purposes of clarity.

Supported in a central location between the upper and lower plates 41 and 44, is an additional plate 56 which is supported between a third pair of coil springs 57 and 58. Spring 57 extends between the lower surface of upper plate 41 and the upper surface of plate 56, and spring 58 extends between the upper surface of lower plate 44 and the lower surface of plate 56.

Plate 56 comprises the base portion of a generally square-shaped element 65 shown more clearly in FIG. 3 which also has two side walls 59 and 61 and an upper element 62. Upper element 62 may be coupled to a mirror facesheet 63 or other element whose position is to be controlled by means of a flexure element 64 or another type of coupling Although the design of this embodiment is somewhat more complicated than the embodiment shown in FIG. 1, it provides important advantages. Initially, as the temperature changes, the actuating element, (which we can consider to be square-shaped element 65 and the flexure 64 attached to it), will move a greater distance than in the FIG. 1 embodiment. In particular, let us assume that springs 51, 53 and 58 are made from #302 stainless steel, and springs 52, 54 and 57 are made from Ni-Span-C. As the temperature drops, the modulus of rigidity of the stainless steel springs will increase and they will become stiffer. To maintain the pair of central springs 57 and 58 in equilibrium, therefore, plate 56 (and, along with it, plate 62 and the entire actuating element 65) will move upwardly away from lower plate 44. The action of the two outer spring pairs, since springs 51 and 53 are of stainless steel and will become stiffer, will be to push the upper plate 41 upwards, which will, in turn, carry the lower plate upwards also. This will, in turn, carry the central plate 56 and the actuating element 65 even higher.

The embodiment also has the very important property that when the spring pre-load is changed by tightening or loosening the bolts 38 and 39, the central plate 56 and actuating element 65 will remain stationary. This is very useful in many applications. Consider, for example, a light-weight mirror facesheet on a graphite epoxy substrate as might be employed in outer space.

The nominal expansion coefficients of both the facesheet and the substrate are very close to zero, but because of material inhomogeneities, there will be significant point-to-point variations in the thermal coefficient which results in a thermal warping sensitivity which cannot be predicted before the mirror is assembled.

A plurality of actuators 73 as are shown in FIGS. 2 and 3 can be built into the mirror at each connection point between the facesheet 71 and the substrate 72 as is schematically illustrated in FIG. 4. The mirror can then be tested thermally in the laboratory for the temperatures it will encounter in space, and the coefficients of the actuators can then be individually adjusted by tightening or loosening the adjusting screws 38 and 39 (FIG. 2) while the mirror is at room temperature. From that time onward, the mirror will be passively self compensated for its material inhomogeneities and would always retain its figure.

FIG. 5 illustrates yet another embodiment of the invention. Specifically, FIG. 5 illustrates an actuator of the type shown in FIG. 1 together with an annular heating element 81 surrounding it to control temperature and, hence, the position of actuating surface 84 (or 85). A circuit including the heating element, an appropriate current source 82, and a temperature sensor 83 can be provided to maintain the actuating surface in a desired position at all times. Such an embodiment could be used in fine positioning at ordinary ambient temperatures as a function of applied current.

While the above, constitute the presently most preferred embodiments of the invention, the invention could obviously take many other forms. For example, other arrangements of springs could readily be devised. Also, other types of springs could be used. Leaf springs, for example, could be employed if desired (in such case, we would talk about the modulus of elasticity of the springs rather than the modulus of rigidity as with coil springs). In addition, different spring materials can obviously also be used.

Because the invention can take many forms, it should be understood that it is to be limited only insofar as is required by the scope of the following claims.

We claim:
1. Thermal actuator apparatus comprising:
   a. a first actuator portion and a second actuator portion;
   b. spring means for supporting said first and second actuator portions for relative movement, said spring means including first and second spring means having first and second thermo-elastic coefficients respectively, said second thermo-elastic coefficient being different from said first thermo-elastic coefficient, wherein said first and second spring means define a balanced spring system which is normally in equilibrium, and wherein a change in temperature will upset the equilibrium between said first and second spring means resulting in relative movement between said first and second actuator portions as said spring system adjusts to a new equilibrium condition; and
means for adjusting the initial force on said spring means for adjusting the responsiveness of the actuator to changes in temperature.

2. Thermal actuator apparatus as recited in claim 1 wherein said first and second spring means comprise coil springs.

3. Thermal actuator apparatus as recited in claim 1 wherein said first spring means has a very low thermo-elastic coefficient such that it will have a nearly constant spring rate over a large temperature range, and wherein said second spring means has a relatively high thermo-elastic coefficient such that it will exhibit a significant change in spring rate over a large temperature range.

4. Thermal actuator apparatus as recited in claim 3 wherein said first spring means is made of Ni-Span-C and wherein said second spring means is made of stainless steel.

5. Thermal actuator apparatus as recited in claim 1, wherein said second actuator portion comprises a moveable actuator portion having an actuating surface adapted to be coupled to an object, the position of which is to be controlled.

6. Thermal actuator apparatus as recited in claim 5 wherein said first actuator portion is rigidly mounted for being maintained stationary relative to said second actuator portion.

7. Thermal actuator apparatus as recited in claim 1 wherein said means for adjusting the initial force on said spring means comprises rotatable screw means, whereby the initial force on said spring means may be increased or reduced by rotating said screw means one way or the other.

8. Thermal actuator apparatus as recited in claim 7 wherein said first and second spring means comprises coil springs and wherein said screw means extends through the center of said coil springs.

9. Thermal actuator apparatus as recited in claim 1 and further including temperature control means for controlling the temperature in the vicinity of said actuator apparatus for controlling the relative movement between said first and second actuator portions.

10. Thermal actuator apparatus as recited in claim 9 wherein said temperature control means comprises heating means.

11. Thermal actuator apparatus as recited in claim 5 wherein said first actuator portion is itself moveable relative to a stationary support member and wherein said apparatus further includes additional spring means having differing thermo-elastic coefficients whereby a change in temperature will also cause relative movement between said first actuator portion and said support member.

12. Thermal actuator apparatus comprising:
   a. a first actuator portion and a second actuator portion;
   b. first and second spring means for supporting said first and second actuator portions for relative movement, said first and second spring means having first and second thermo-elastic coefficients, respectively, which are different from one another, said first and second spring means defining a balanced spring system which is normally in equilibrium, but in which a change in temperature will upset the equilibrium therebetween resulting in relative movement between said first and second actuator portions as said spring system adjusts to a new equilibrium condition; and
   c. means for adjusting the initial force on said first and second spring means for adjusting the responsiveness of the actuator to changes in temperature.

13. Thermal actuator apparatus as recited in claim 12 wherein said second actuator portion is moveable relative to said first actuator portion and includes an actuating surface adapted to be coupled to an object, the position of which is to be controlled.

* * * * *